United States Patent [19]
Hodges et al.

[11] Patent Number: 6,092,215
[45] Date of Patent: Jul. 18, 2000

[54] SYSTEM AND METHOD FOR RECONSTRUCTING DATA IN A STORAGE ARRAY SYSTEM

[75] Inventors: Paul Hodges, Los Gatos; Robert Wesley Shomler, Morgan Hill, both of Calif.

[73] Assignee: International Business Machines Corporation, Armonk, N.Y.

[21] Appl. No.: 08/940,105

[22] Filed: Sep. 29, 1997

[51] Int. Cl.[7] ....................................................... G06F 11/00
[52] U.S. Cl. .................................. 714/6; 714/52; 711/114
[58] Field of Search ..................................... 711/114, 115, 711/117; 714/725, 770, 800, 801, 802, 803, 804, 52, 6, 7; 370/216

[56] References Cited

U.S. PATENT DOCUMENTS

| | | | |
|---|---|---|---|
| 4,092,732 | 5/1978 | Ouchi | 364/900 |
| 4,775,978 | 10/1988 | Hartness | 371/38 |
| 4,870,643 | 9/1989 | Bultman et al. | 371/11.1 |
| 4,914,656 | 4/1990 | Dunphy, Jr. et al. | 371/10.2 |
| 4,989,206 | 1/1991 | Dunphy, Jr. et al. | 371/10.1 |
| 5,072,378 | 12/1991 | Manka | 395/575 |
| 5,208,813 | 5/1993 | Stallmo | 371/10.1 |
| 5,253,256 | 10/1993 | Oyama et al. | 371/40.1 |
| 5,278,838 | 1/1994 | Ng et al. | 371/10.1 |
| 5,305,326 | 4/1994 | Solomon et al. | 371/11.1 |
| 5,331,646 | 7/1994 | Krueger et al. | 371/40.1 |
| 5,345,565 | 9/1994 | Jibbe et al. | 395/325 |
| 5,390,327 | 2/1995 | Lubbers et al. | 395/575 |
| 5,396,620 | 3/1995 | Burghart et al. | 395/575 |
| 5,479,653 | 12/1995 | Jones | 395/182.03 |
| 5,644,789 | 7/1997 | Matthews et al. | 711/114 |
| 5,657,468 | 8/1997 | Stallmo et al. | 711/114 |
| 5,875,456 | 2/1999 | Stallmo et al. | 711/114 |

OTHER PUBLICATIONS

C. Crews et al., Method for Background Parity Update in a Redundant Array of Expensive Disks (RAID), IBM Technical Disclosure Bulletin, vol. 35, No. 5, Oct. 1992, pp. 139–141.

Patterson et al., A Case for Redundant Arrays of Inexpensive Disks (RAID), A.C. Sigmod Conference, Chicago, Illinois, Jun. 1–3, 1988, pp. 109–116.

The RAIDbook, A Source Book for Disk Array Technology:, 5th Edition, Feb., 1996.

*Primary Examiner*—Robert W. Beausoliel, Jr.
*Assistant Examiner*—Pierre Eddy Elisca
*Attorney, Agent, or Firm*—Esther E. Klein

[57] ABSTRACT

A system and method are provided for coordinating command for updating and reconstructing data in an array of storage devices connected to a computer system when multiple initiators issue commands. Sets of data blocks and corresponding parity blocks are arranged on a plurality of storage devices, such that a data block can be reconstructed using a set of data blocks and at least one parity block. When a new data block is written to the disk drive, a corresponding old parity block is write updated with an updated parity block. When reconstructing an unavailable data block an initiator issues a read command to each storage device having a data block or a parity block used for reconstructing the unavailable data block. Each read command is enqueued on a command queue for each storage device in a priority order coordinating each read command with any write update command for the same block so that a new data block and an old parity block are not read as part of the same parity stripe and vice versa.

20 Claims, 12 Drawing Sheets

SYSTEM AND METHOD FOR RECONSTRUCTING DATA IN A STORAGE ARRAY SYSTEM

FIELD OF THE INVENTION

The present invention relates to arrays of storage devices such as a redundant array of independent disks (RAID). More particularly, the invention relates to a data storage system where parity update operations are performed by more than one controller initiating commands such as in an array where parity hardware is provided on the drives and parity operations are performed under drive control.

BACKGROUND OF THE INVENTION

Arrays of hard disk drives (HDDs)connected to host computer systems are commonly used for computer data storage. Disk drive arrays provide large storage capacities and high reliability at a low cost.

U.S. Pat. No. 4,870,643 teaches an array of disk drives where a set or stripe of data blocks and a parity block for the set are stored on separate disk drives, with no one disk drive having all the parity for all of the sets. In the event a disk drive fails, each block of data on the unavailable disks can be reconstructed using the remaining blocks in the set. Whenever a data block is updated with new data the associated parity is also updated. This is often referred to as a RAID level 5 system.

In Patterson et al., "A case for Redundant Arrays of Inexpensive Disks (RAID)", A. C. Sigmod Conference, Chicago, Ill., Jun. 1–3, 1988, pp. 109–116, five levels of RAID were defined. In each of the RAID levels, an array of disk drives includes redundant data which can be used to reconstruct data in the event one of the drives fails. RAID level 1 refers to data mirroring where a duplicate copy of the data on one disk drive is stored on a separate disk drive. RAID level 2 uses Hamming codes to provide error detection and correction for a data set. In a RAID level 3 system, a block of data is divided into N portions for storage on N disk drives. The portions of the data block are exclusive ORed (XOR) to produce parity which is written to a separate N+1 disk drive. In a RAID level 4 system, blocks of data are stored on separate disk drives with the parity (XOR) information for a set of blocks of data being stored on a separate dedicated disk drive. The set of blocks are referred to as a stripe of data blocks. Typically, the data blocks and the parity block of a set or stripe are written to the same logical block address on respective disk drives. A RAID level 5 system is similar to RAID level 4 system except that the parity is distributed among all of the disk drives. In RAID level 5 arrays, disk drives operate independently of each other, so that multiple read and write operations can access separate blocks of data at the same time.

The RAID advisory board in its RAID book, "A Source Book for Disk Array Technology", 5th Edition, recognizes these five levels of RAID and defines a sixth level of RAID. In RAID-6, a second independent parity block is provided for each set, so that there are N+2 member disks. This allows data on two failed disk drives to be reconstructed.

In all RAID systems, when data is written (updated), the corresponding redundant data needs to be updated as well. In RAID levels 4 through 6 systems, where the data blocks are independently accessed on separate disk drives, during a write operation, parity can be updated by XORing the old data, the new data and the old parity. Alternatively, a set of data blocks can be written together with its parity to the set of disk drives.

In most prior art RAID storage systems, a RAID controller manages the storage and retrieval of the data on the array of disk drives and the parity generation. Array management software running on one host system or in a storage subsystem manages the storage and retrieval of data to and from the storage devices. Application programs running on the host system provide a logical disk address for writing and retrieving data. The array management software translates the address and reads the contents of the requested block into the host memory. When modifying data, the array management software on the host or a storage controller reads the contents of the block to be modified and the corresponding parity block, and then calculates an exclusive OR (XOR) on the old data, old parity, and the new data. The array management software then writes the new parity back to its parity location and writes the new data to its prior location. A RAID controller can be implemented purely in software or a combination of microcode and hardware. The controller and parity generator can reside in the host computer system or in a separate storage subsystem.

More recently, array management systems have been designed where array management functions and parity generation are performed within the storage devices rather than using a separate controller. More specifically, disk drives have been designed with the XOR engine incorporated into the drive. The disk drives rely on peer-to-peer communication over an interface, such as the Small Computer Standard Interface (SCSI), to manage the implementation of the parity updates and reconstruction.

Performing XOR operations in the disk drive can result in reduced data transfers across the interconnections between the disk drives and the host system.

In a host based or sub-system based array management system, when a RAID level 5 write operation is performed, there are four data transfers that are involved and the array controller executes two XOR operations. These four transfers are: (1) transferring the old data to the controller (2) transferring the old parity to the controller (3) transferring the new data from the controller, and (4) transferring the new parity from the controller.

In a RAID system where the drives perform the XOR operations, data can pass directly from drive to drive for the XOR operations. This greatly reduces the amount of work that a separate host computer or controller has to perform and reduces the amount of data transfers over the interfaces between the drives and the controller. For a write operation (which includes updating parity) the number of data transfers is reduced from four to two. The two data transfers are (1) transfering the new data to the disk; and (2) transfering the XOR difference to the disk where the corresponding (old) parity is stored. In such an array, a new data block is transferred from the host to the disk drive where the old data block is stored. The disk drive accepts the new data, reads the corresponding old data from its disk, and performs an XOR operation to determine the XOR difference between the old data and the new data. The disk drive then acts as an initiator to transfer the old data/new data XOR difference to the disk drive that has the corresponding parity for the data block being updated. The disk drive that has the parity, accepts the XOR difference and performs an XOR operation between the XOR difference and the old parity (read from its disk) to produce the new parity. The new parity is then written back to its disk. By performing the XOR operation in the disk drives, there is also no longer a need for the array controller to perform XOR operations.

The ANSI Standards Committee established commands for implementing RAID functions on a set of disk drives having XOR function capabilities. See: "XOR commands on SCSI Disk Drives" X3T/1/96-IIIR2. Such a system is referred to as an XOR-on-the drive system. The current proposed ANSI standard for "XOR commands" on SCSI disk drives includes read (READ), data update (XDWRITE), parity update (XPWRITE), and reconstruction (REGENERATE and REBUILD) commands. The XDWRITE, REGENERATE and REBUILD commands are executed by drives acting as temporary initiators using peer-to-peer communication. There have also been enhancements to the current proposed SCSI standard. Commonly owned patent application, Hodges, "A System and Method for Distributing Parity in an Array Operation" Ser. No. 08/396,046, teaches a system where the drives store information on the RAID configuration which otherwise would be provided by the host. These enhancements use commands similar to the proposed standard.

The READ command is the most common proposed ANSI command. A host requesting a specific data block issues a READ command to the appropriate disk drive to read that block of data.

Update operations involve writing data on one drive of the array and updating corresponding parity information on a second drive. There are two commands in the proposed ANSI standard that are used to accomplish an update, XDWRITE and XPWRITE. The host issues an XDWRITE command and sends new data to the disk drive where the old data is stored. This disk drive then acts as an initiator. The initiator calculates a parity difference between the old and new data by XORing the new data with the old data read from its disk. The initiator issues an XPWRITE command sending the calculated parity difference between the new and old data to the drive containing the corresponding parity for the data. The parity drive XOR's the parity difference with the old parity, read from its disk, in order to produce the new parity, which is then written back to its disk.

Reconstruction operations involve reading data from multiple drives of the redundant array and performing an exclusive OR operation to recover data. There are two commands in the proposed ANSI standard relating to the reconstruction of data, REGENERATE and REBUILD.

The REGENERATE command is used in place of a READ command when a data drive in the array has malfunctioned. A host computer sends a known good drive the REGENERATE command with the addresses of the source drives (i.e. the drives storing the data and parity blocks of the unavailable block's stripes), the corresponding logical block addresses of the data and parity blocks, and the number of blocks to be reconstructed. The known good drive takes on the role of the initiator and sends READ commands to all of the other drives which have the corresponding data blocks and parity blocks in the same set or stripe as the data block to be regenerated, and also reads the data from its own disk. The blocks from all the drives are then sent back to the initiator drive where the blocks are exclusive ORed, and the result is then sent to the host.

The host sends a REBUILD command to a replacement drive to be rebuilt, which acts as an initiator. The drive has the addresses for the other source drives as well as the logical block addresses and the number of blocks to be rebuilt. The initiator issues READ commands to all of the source drives having data blocks or parity blocks in the parity stripe of the block to reconstructed. When the drive receives all of these blocks, it exclusive OR's the blocks and writes the result of the exclusive OR operation to its disk.

Reconstruction requires that data from all devices be read at the same logical point in time so that the data blocks of a stripe and the corresponding parity block are consistent. If reconstruction and update operations are performed on the same data blocks without specific coordination there is a possibility of incorrect reconstruction. To ensure consistency no writes may be permitted to data blocks of the stripe on any drive until all of the stripe data and parity blocks have been read from all devices for the data to be reconstructed. This is readily accomplished by a single RAID controller. A single controller can serialize accesses to its attached DASD as needed. It is more difficult in a distributed RAID controller environment such as presented by XOR-in-drive configurations. The present ANSI definitions leave the serialization and coordination of the operations to the host system. The problem of incorrect reconstruction arises when the reconstructed and updated operations are performed by two independent initiators, each initiator being unaware of what the other initiator is doing.

FIG. 1 shows an example where a disk drive controlled array tries to implement conflicting command executions for blocks in the same parity stripe. An application program running on a host 10 update writes a data block B3, stored on drive D4, while the same or a different host reads a data block B4, from the same parity stripe as block B3, that is stored on drive D5. Since the drive D5 has failed, the data block B3 will need to be reconstructed.

In order to reconstruct data block B4 stored on the failed drive, the host issues the command REGENERATE to drive D1. Drive D1 acts as an initiator for the regeneration function using the corresponding data and parity blocks from B4's parity stripe stored on drives D1, D2, D3 and D4.

Shortly after drive D1 receives the REGENERATE command, drive D4 receives an XDWRITE command to update block B3. The update write of block B3 requires the updating of the corresponding parity block for the stripe which is stored on drive D2.

As shown in FIG. 1, without the proper coordination of the execution of the commands, the regeneration operation incorrectly uses the old parity block with the new data block for a parity stripe.

Drive D1 issues commands to drives D2, D3 and D4 to read blocks P, B2, and B3 12 and reads the corresponding data block B1 from its own disk 14. When all of the data and parity blocks are received, drive D1 XORs the data and parity blocks 16.

When drive D3 receives the READ command issued from drive D1 (as part of the regeneration), there are no other commands waiting to execute, so drive D3 executes the READ command from D1 and sends the read data to drive D1 18.

Meanwhile, drive D4 executes the XDWRITE command for block B3 and acting as a second separate initiator issues an XPWRITE command to drive D2 (where the corresponding parity P is stored) 20. Drive D4 enqueues the READ command issued from drive D1 (for the regeneration) 22. After drive D4 completes the execution of the XDWRITE command by reading the old data, sending the parity difference to drive D2, and writing the updated data block to its disk 24, drive D4 then executes the READ command P from its queue (issued from drive D1) 25. At that point, drive D4 is reading the updated data block.

When drive D2 receives the READ command from drive D1 (as part of the REGENERATE function) 26 and executes it, drive D2 is reading the old parity still stored on its disk. After drive D2 has read the old parity, drive D2 executes the XPWRITE command and updates the parity 28.

Drives D2 and D4 are executing the commands in the order in which the commands are received. In so doing, the old parity and the updated data are read for the regeneration of a data block producing the incorrect data.

FIGS. 2 through 4 show further examples where competing commands from the same or different hosts for blocks in the same parity stripe can result in inconsistencies.

FIG. 2 shows REGENERATE and XDWRITE commands as described in the previous example. A host issues a REGENERATE command to a surrogate drive D1 to "read" a data block from a failed drive D5. Drive D1 issues READ commands to drives D2, D3, D4 and D5 to read the other blocks of the parity stripe for the requested block 30. At the same time, the same or different host is updating a data block from the same parity stripe stored on drive D2 32. Drive D2 updates the data block and issues an XPWRITE command to drive D4 34. Due to the uncertainty of when the commands will be executed, the READ operation for the reconstruction may return old data or updated data from drive D2 and old parity or updated parity from drive D4.

Referring to FIG. 3, a REBUILD command is issued to drive D1 which is a repaired drive. Drive D1 issues READ commands to drives D2, D3, D4 and D5 to regenerate a data block B1 36. At the same time, drive D2 receives an XDWRITE command to update a data block B2 needed for the rebuild command. The corresponding parity for blocks B1 and B2 is stored on drive D4. Drive D2 issues an XPWRITE command to drive D4 to update the parity 38. Inconsistencies can arise for the REBUILD command at drives D2 and D4 since the READ operation for the REBUILD at drive D2 may return old data or updated data while the READ operation for the REBUILD being executed at drive D4 may return old parity or updated parity.

Inconsistencies can also arise for an update write to a failed drive. Referring to FIG. 4, a data block B4 on a failed drive D5 is updated. Data block B4 is being written to a surrogate drive D1. In order to determine the updated corresponding parity, surrogate drive D1 acting as a first initiator issues READ commands to drives D2 and D3 for the other data blocks of the parity stripe 40. Drive D1 then writes the updated parity to drive D4 42. At the same time, drive D2 receives an XDWRITE for a data block in the same parity stripe and acts as a second independent initiator for this operation. The read operation issued from drive D1 to drive D2, may return old data or updated data. The parity write operation on drive D4 may be based on one or both data updates and may occur before or after the XPWRITE issued from drive D2.

The current proposed ANSI standard is predicated on the assumption that the host will ensure that no data is involved in an update and a reconstruction operation at the same time by coordinating the issuance of commands and reserving drives. This host action adds complexity to an already complex host program especially if two or more hosts are involved. A host independent solution is needed for a drive controlled array that uses XOR commands.

Accordingly, there is a need to provide a host independent procedure for reconstructing data using array commands on the drives, where each drive can act as temporary initiator for each separate command. It is necessary that such a system avoid the problem of having new data combined with old parity or old data with new parity for a reconstruction operation. Generally, there is a need to coordinate reconstruction and update commands in a RAID system having two or more initiators implementing the RAID functions, such as a system having multiple independent RAID controllers.

SUMMARY OF THE INVENTION

It is an object of this invention to provide a storage array that distributes control functions among disk drives having parity generators where reconstruction operations can be performed with integrity such that updated data blocks are not used with old parity blocks or vice versa.

A data processing system incorporating the invention includes an array of storage devices attached to at least one host computer. Each storage device comprises a processor, memory, and a storage media. Sets of data blocks and corresponding parity blocks are arranged on the storage media so that an unavailable block of data can be reconstructed using the remaining data blocks of the set and the set parity block. When an old data block is updated with a new data block, a corresponding old parity block is updated with an updated parity block. An interface connection between each of the storage devices is used for sending and receiving commands for reading and writing data and parity blocks.

A reconstruction initiator coordinates the reconstruction of a data block using the remaining stripe data blocks and parity block read from the storage devices independent of the host system. Each storage device has a command queue for prioritizing commands used while reconstructing a data block with other write commands for the same data block such that the unavailable data block is reconstructed without combining an updated data block with an old parity block or vice versa. The initiator can be one of the storage devices in an XOR-on-the drive controlled array where separate storage devices can function as a controlling initiator for separate regeneration and update commands. Alternatively, the initiator may be one of a plurality of independent storage controllers.

According to a preferred embodiment of the invention, an unavailable data block is reconstructed by an initiator first issuing a command to each storage device having one of the remaining set data blocks and set parity block. That command gets executed or queued on a command queue at each storage device in a priority order, coordinating each such command with any write command for the same data or parity so data and parity are consistent. That is, an updated data block is not used as one of the remaining set data blocks when an old parity block is used as the set parity block or vice versa. When the initiator receives the remaining set data blocks and set parity block from the storage devices, the initiator logically combines these blocks to reconstruct the unavailable data block.

In a first preferred embodiment, the command to read the set parity block is issued by the reconstruction initiator and an acceptance notification received from the drive having the parity block before the commands to read the remaining set data blocks are issued by the reconstruction initiator to the other drives. The queuing priority is such that the commands for reading the remaining set data blocks are queued at each respective drive ahead of any prior or subsequent update write commands for the same data blocks. Subsequently received parity write update commands at the drive having the parity for the set parity block are queued behind the command issued by the reconstruction initiator to read the set parity block. If a write update command is in progress for a set data block when the command issued by the reconstruction initiator to read that set data block is received, the reconstruction operations are aborted.

In a second preferred embodiment, the first (reconstruction) initiator issues commands to read the remaining data blocks and then issues a command to read the parity block after all prior update commands for the remaining data blocks have completed. Subsequently received update commands to read the remaining data blocks are not executed until after all of the remaining data blocks and parity block have been read.

In a third preferred embodiment the first (reconstruction) initiator issues commands to read the remaining data blocks and then issues a command to read the parity block after all prior update commands for the remaining data blocks have completed. Subsequently received update commands for the parity blocks are not executed until after all of the remaining data blocks and parity block in the stripe have been read.

In another aspect of the invention, an article of manufacture is provided for use in a parity array of storage devices for reconstructing an unavailable data block. The array attaches to a host computer system and each storage device comprises a processor, memory, storage media having sets of data blocks and corresponding parity blocks arranged on the media, such that a data block can be reconstructed using the remaining set data blocks and set parity block. The article of manufacture comprises a computer readable storage medium having computer program code embodied in the medium causing an initiator storage device to issue a command to each set storage device to read the remaining set data blocks and set parity block; queue the initiator's command on the queue for each set storage device in a priority order such that only consistent parity and data blocks are used for reconstruction; and logically combine the remaining set data blocks and set parity blocks read from the set storage devices to produce a reconstructed data block.

BRIEF DESCRIPTION OF THE DRAWINGS

The nature, object and advantages of the invention will become more apparent to those skilled in the art with reference to the following detailed description in connection with the accompanying drawings.

DETAILED DESCRIPTION OF THE DRAWINGS

A typical RAID-5 system includes N+1 hard disk drives (HDDS) storing N disk drives of data and one disk drive of parity, where no one disk drive stores all of the parity for the system. Considering corresponding blocks across N+1 drives, there will be N data blocks and 1 parity block, making up a parity set or stripe. The present invention particularly applies to any array configuration in which data on individual HDDs are updated independently, parity stored on separate HDDs is used for reconstructing data, and updates and reconstructions are controlled by independently operating initiators controlling the functions. Such systems include RAID levels 4, 5 and 6 using drive controllers or multiple controller subsystems.

Figure 1:
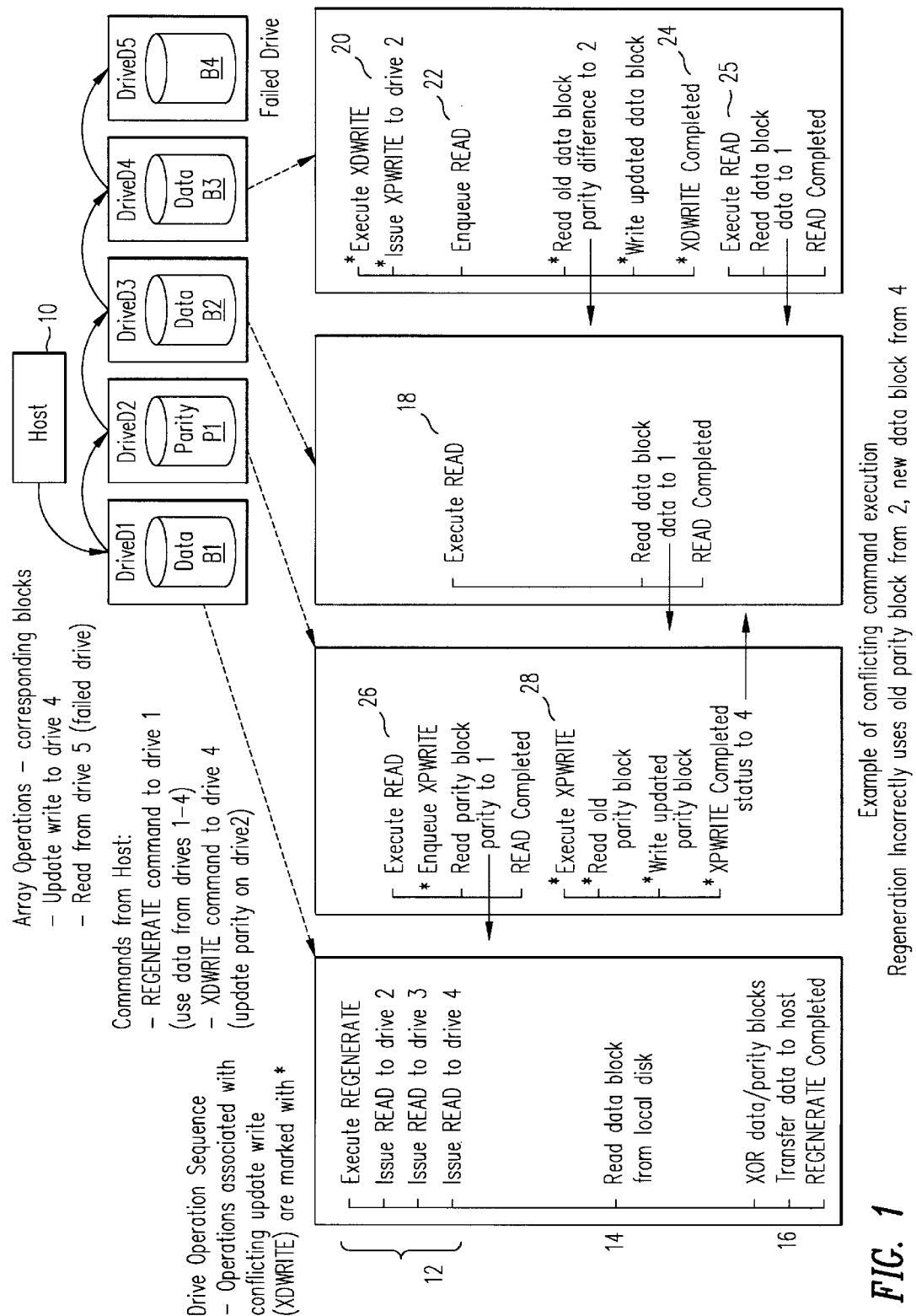
FIG. 1 is a block diagram of the data paths for a regeneration operation showing inconsistencies.
Figure 2:
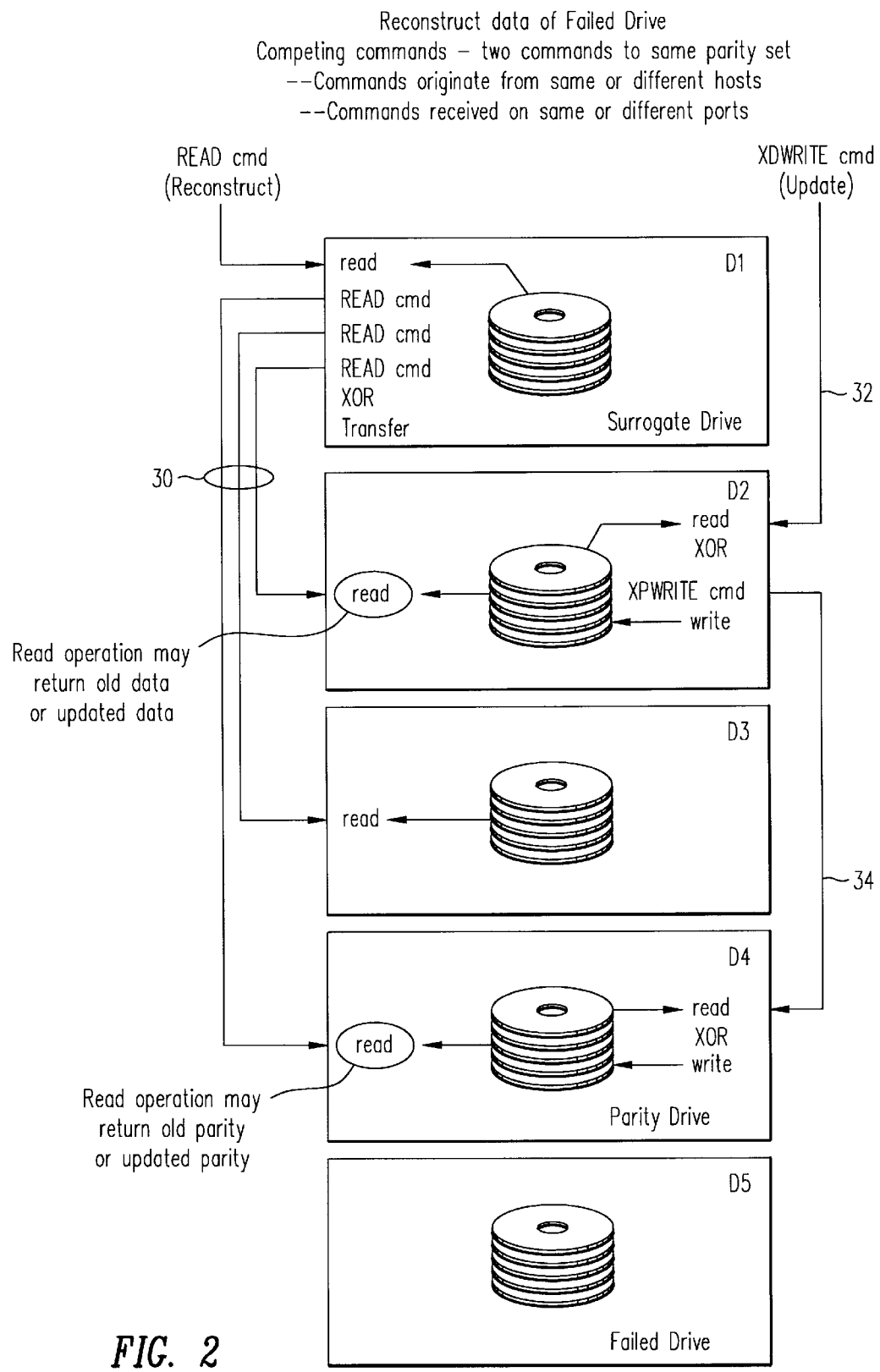
FIGS. 2–4 are block diagrams of data paths for RAID functions showing competing commands.
Figure 3:
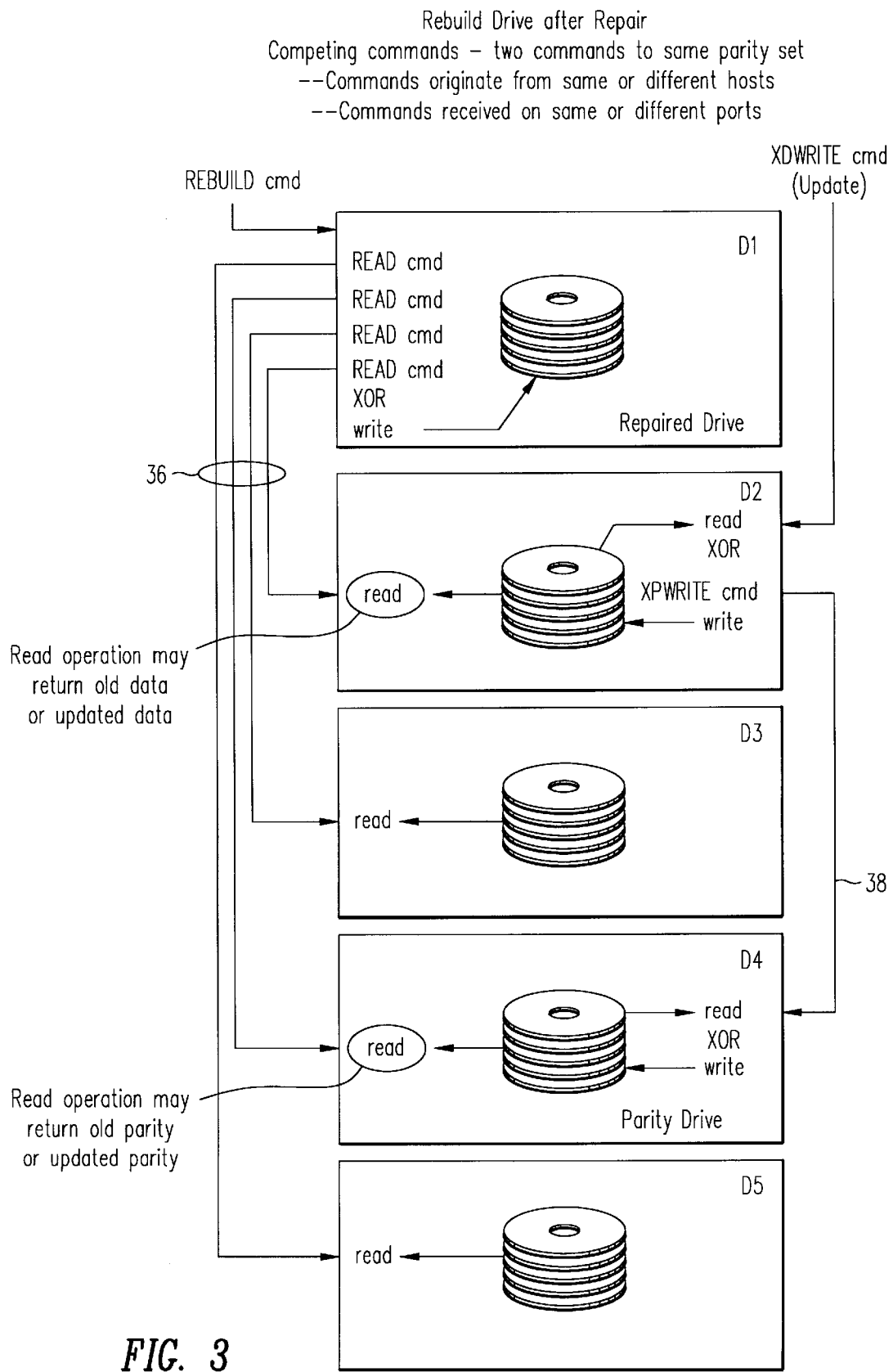
Figure 4:
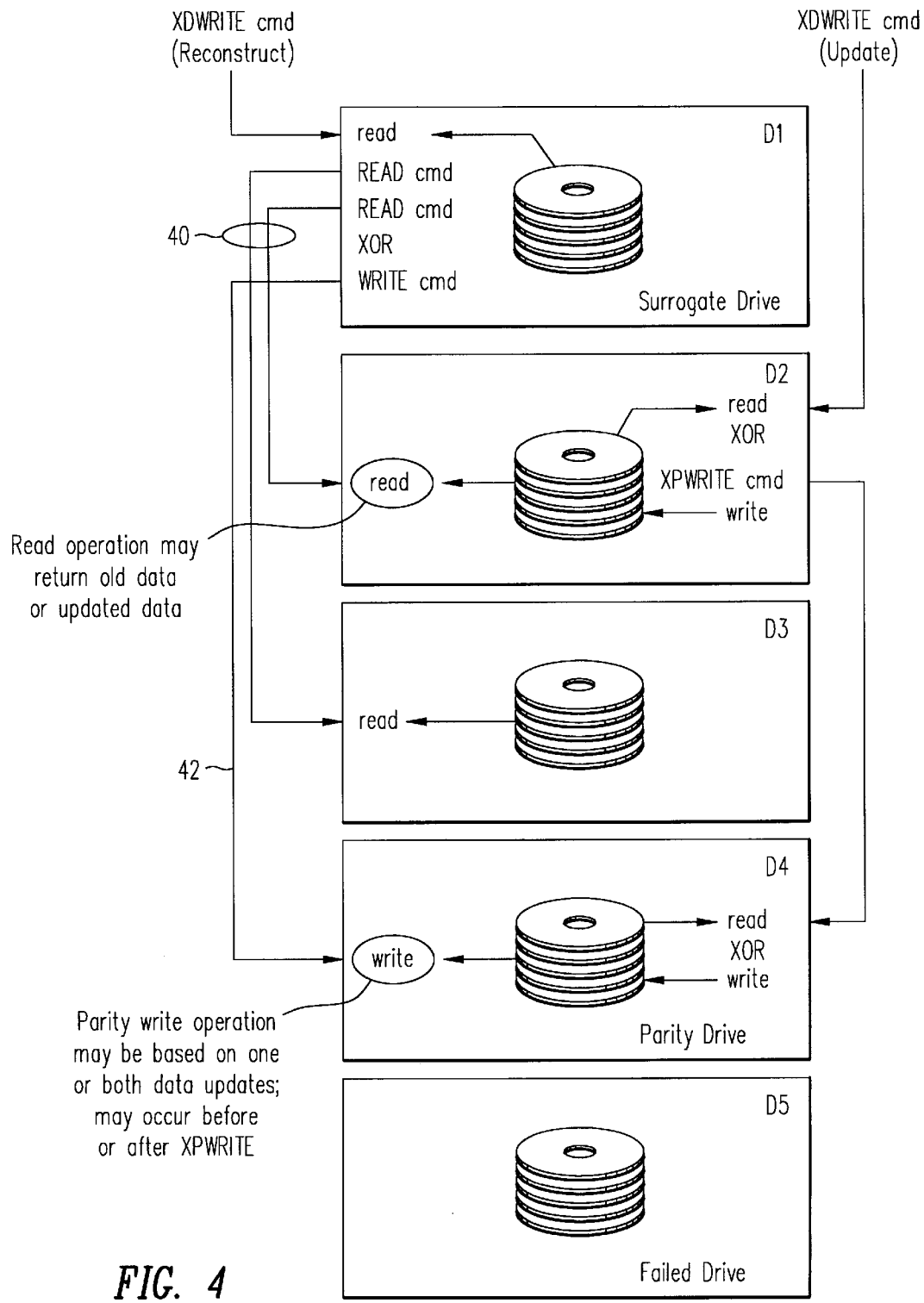
Figure 5:
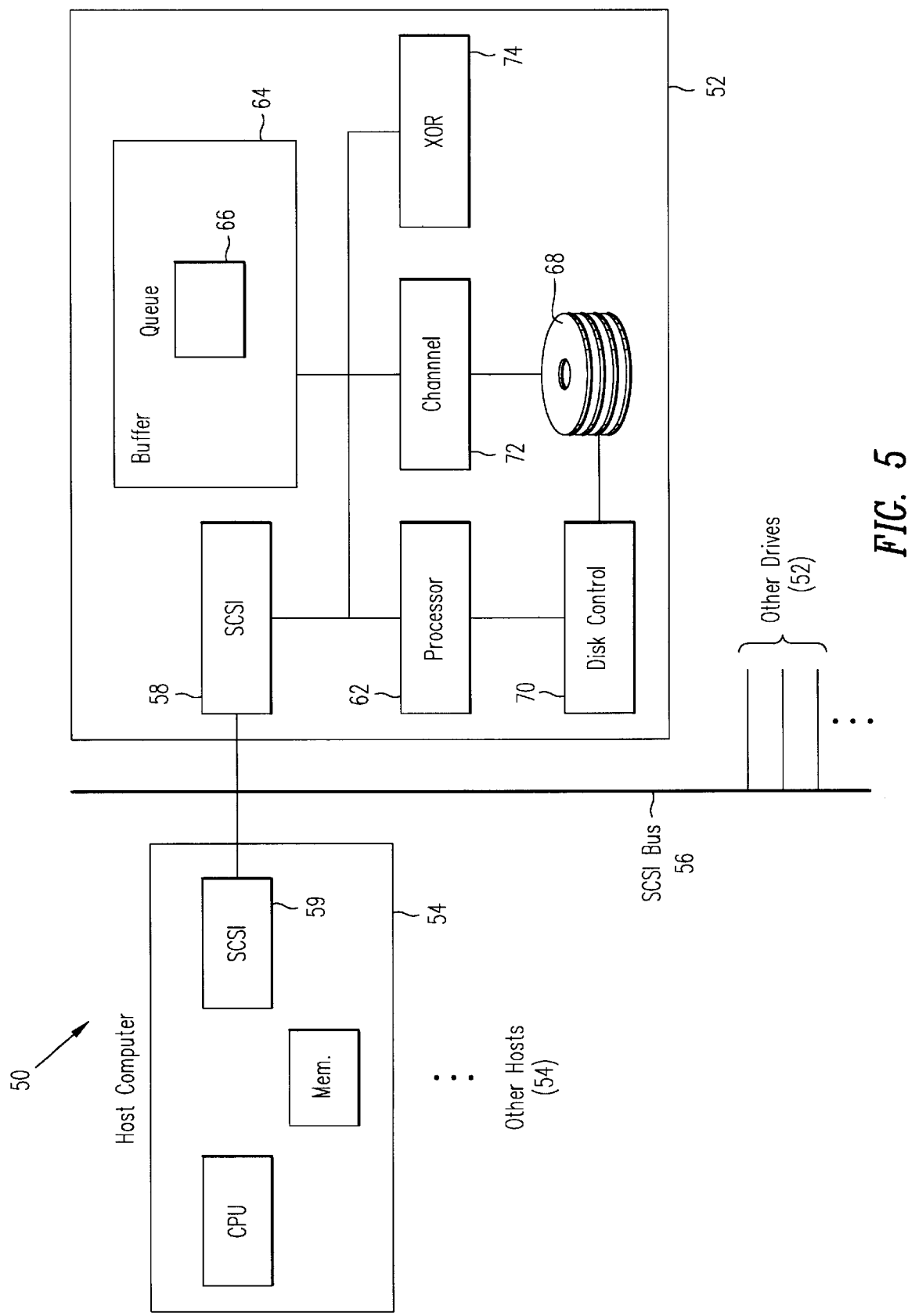
FIG. 5 is a block diagram of the data storage system in accordance with the invention.

FIG. 5 shows a block diagram of a multiple initiator storage system in accordance with the invention. The storage system 50 is an array of disk drives having peer-to-peer communication and XOR function comprising a plurality of storage units or devices 52, such as hard disk drives or other direct access storage devices (DASDS). The one or more host computer 54 can be a large mainframe computer or a smaller computer of any make or architecture including microprocessor based personal computers. The storage device may comprise a hard disk drive with one or more spinning magnetic recording media. Alternatively, the storage devices may comprise optical disk drives, magnetic tape drives, floppy or rigid diskette, random access memories or other suitable computer readable data storage devices.

The storage devices 52 and host computer 54 are interconnected via a common bus system 56, such as a parallel bus configured in accordance to the Small Computer Standard Interface (SCSI) architecture. Alternatively, the host computer system can be attached to the array using a serial interface compatible with the SCSI command set, such as the Serial Storage Architecture (SSA), or alternatively, a fiber channel arbitrated loop (FC-AL) interconnection. A different scheme for the interconnection may also be used which provides means for exchanging signals between the host and each of the disk drives, and for peer-to-peer communication between the disk drives and/or a command set different from SCSI.

According to one preferred embodiment of the present invention most of these array management processes are performed by the disk drives themselves using some combination of software, microcode, and hardware.

Referring to FIG. 5, in an XOR-on-the drive array each storage device 52 has a SCSI adapter 58 in communication with the host SCSI interface 59. The SCSI adapter 58 can act as either a target or an initiator, as defined by the SCSI architecture.

Each storage device also has a processor 62 that controls the storage media and performs data transfers. Preferably, processor 62 is a microprocessor. The processor 62 executes array control functions stored in a buffer 64 or ROM.

The controller in the disk drive can comprise discrete circuit components or an application specific integrated circuit (ASIC) to perform the operation. Alternatively, the controller may comprise a digital computing system which runs software appropriate to execute the functions.

The memory buffer 64 stores the programs that run in the processor and is used to buffer the data. The buffer also contains a queue 66 used to queue the commands to be carried out by the disk drive. The processor 62 controls the storage media 68 through control logic and drivers 70, connected to actuators, which in the case of magnetic disk drives move the magnetic read/write heads over the media 68. Data which is written to and read from the media passes through a read/write channel 72, which is connected to the read/write head by amplifiers. The processor 62 is connected to the SCSI adaptor 58, the memory 64, and the read/write channel 72 by a standard microprocessor bus, which in the preferred embodiment is a 16 bit wide data and address bus of the type employed by the Intel microprocessor 80186.

An exclusive OR generator 74 generates a parity syndrome and a new parity block in conjunction with the invention. In the preferred embodiment, the exclusive OR logic is implemented in hardware circuitry connected by a bus to the processor and memory. The exclusive OR logic can be implemented either completely or in part in a program executing in the processor. As is well known to those skilled in the art there are other types of redundancy data than can be used. For example, a second redundancy block can be used which provides B-adjacent (ECC) codes for reconstructing data on a second unavailable disk drive.

Figure 6:
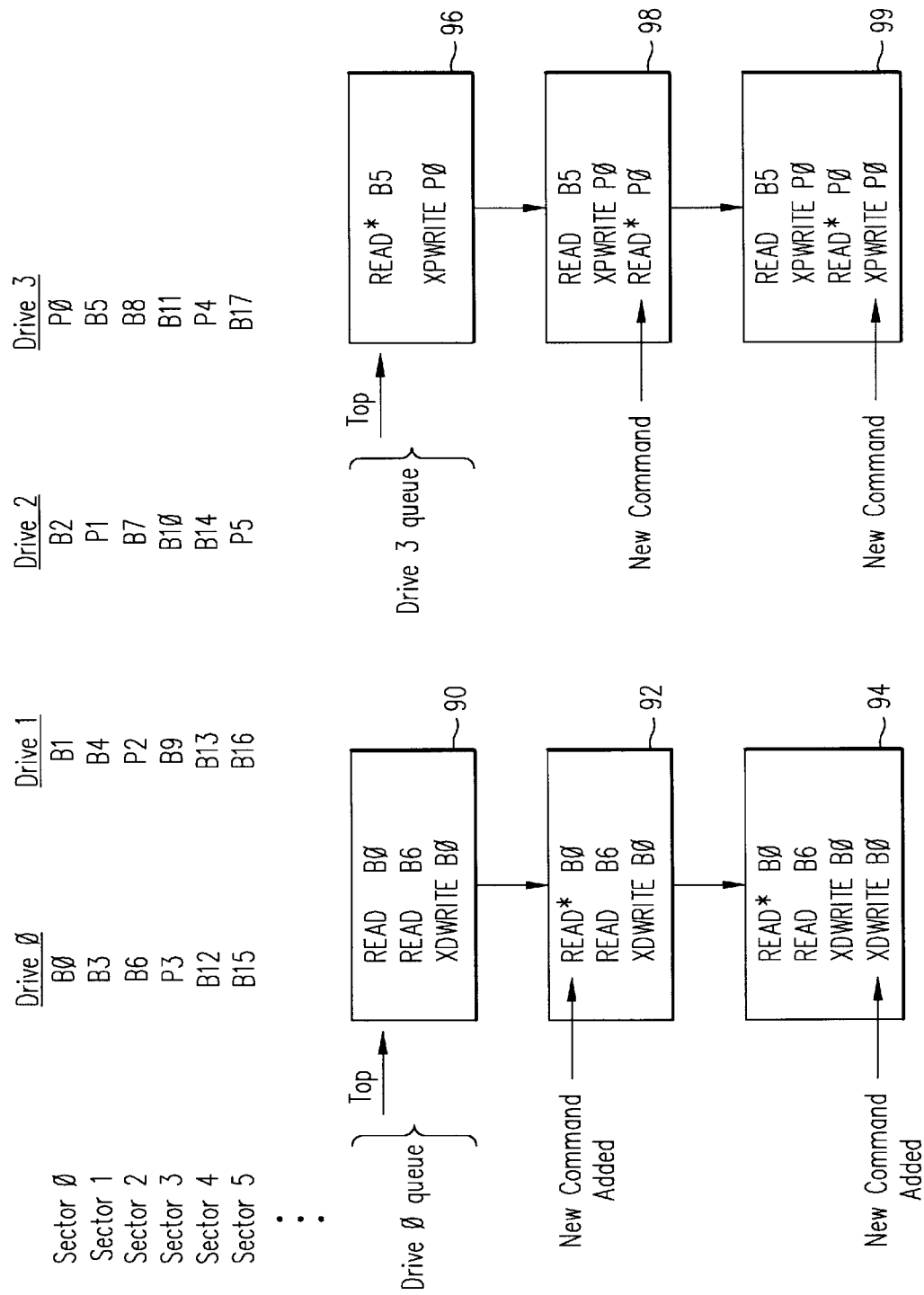
FIG. 6 is a diagram of an arrangement of the blocks on a set of storage devices and commands on the storage device queues in accordance with the invention.

Referring to FIG. 6, parity is established across the devices based on the block address. All data blocks and the parity blocks of a stripe have the same logical block addresses on their respective drives and the same transfer lengths. Parity mapping is a function of the block address. A set of data blocks and a parity block comprise a stripe stored across the storage devices. Parity P0 stored on DRIVE3 is the result of XORing data blocks B0, B1 and B2 on drives 0, 1 and 2. Data block B1 can be reconstructed by XORing the remaining blocks of the stripe, P0, B0, and B2.

For a write update, the host system using the proposed ANSI standard for and XOR-on-the drive array, sends the new data and an XDWRITE command to the drive where the old data is stored. The XDWRITE command causes the data blocks on the target drive to be updated and causes the target drive to act as an initiator and issue an XPWRITE command to a secondary target to update the corresponding parity block. The XDWRITE command (and associated information) is stored in the command queue 66 on the drive. When the command is executed, the drive reads the old data from its disk and exclusive OR's the old data with the received new data. This produces an XOR difference value. This XOR difference value is then sent to the drive where the updated parity information is calculated and stored with an XPWRITE command.

The XPWRITE command and associated information is executed by the parity drive or stored in a command queue for the drive. When the XPWRITE command is executed, the old parity is read from the disk and XORed with the XOR difference value provided with the XPWRITE command to produce the new parity. The new parity is written back to the disk in the same location where the parity had been stored. The XDWRITE command is not considered complete until the associated XPWRITE is completed.

The write data (XDWRITE)and write parity (XPWRITE) commands have a format currently defined in the proposed SCSI standard. The specific implementation of the XOR hardware and other specifics of the implementation of the XDWRITE and XPWRITE commands are well known to those skilled the art and available through the SCSI standards information such as the drive XOR document from the ANSI committee, "XOR commands on SCSI disk drives" X3T/1/96-111R2. As previously described, a regenerate operation is used to regenerate data from a drive that is not available or to regenerate a portion of a drive that is not available. In the event that the drive itself is not available, the host requesting a data block, will issue a REGENERATE command to one of the functioning drives as a surrogate drive. For example, with reference to FIG. 6, the host will issue a regenerate command to DRIVE0 to regenerate block B1 in the event that DRIVE1 is not functioning. When DRIVE0 executes that command, it is acting as an initiator, and it sends out commands to read the data blocks B2 and parity block P0 needed to reconstruct the unavailable block, block B1. The initiator also issues a command to its own disk to read the relevant data block B0 since the initiator disk is storing a block that is part of the parity stripe for the block to be reconstructed. The initiator uses its XOR generator to XOR all of the remaining blocks in the parity stripe, B0, B2, and P0 to regenerate the data block B1. The reconstructed block B1 is sent to the requesting host.

The operation to read the blocks issued by the initiator that is part of the regenerate operation as part of the preferred embodiment is an enhancement of a standard READ command as defined by the current ANSI standard. The special read command issued as part of the regenerate or rebuild operation is referred to as "READ*". The READ* command has special queuing priorities that will be described below. A READ* command also allows the initiator to control when the command ends. A READ* command is completed when the initiator issues an interface sequence. The end of command status acceptance can be held off by the initiator with eventual acceptance of ending status being the gate for allowing the start of the next command time. It may also be effected by the initiator delaying data transfer at a performance cost. There is less of a performance cost if the transfer of only the last block or transfer group is held up by the initiator.

When the disk drives receive the READ* command it is executed or queued in the drive's command queue. When the is executed by a disk drive the appropriate block of data is read and then sent to the initiator.

As also mentioned previously, a rebuild operation refers to an operation where a portion of a disk had been unavailable and is now being overwritten with rebuilt data. When an entire disk drive was not functioning and has been replaced with a new functioning disk drive, there is a need to rebuild all of the data and all of the parity information that had been previously stored on the unavailable disk drive. Data can be rebuilt using the redundancy information of the sets of data blocks and parity blocks for the parity stripes on the other drives. Parity can be rebuilt using the information of the data block for the corresponding parity stripes.

Referring to FIG. 6, in order to rebuild a block B1, the host issues a command to the drive where B1 will be stored DRIVE1. DRIVE1 now becomes an initiator drive. DRIVE1 issues READ* commands (the same as for a REGENERATE operation) to all of the other disk drives which contain the data blocks and parity blocks of the parity stripe to which the block to be reconstructed belongs. the READ* command is received in each of the disk drives, it is executed or queued. When the READ* command is executed, the disk drive accesses the data block from its storage media and sends the block to the initiator DRIVE1.

The initiator drive collects all of the blocks and using the exclusive OR generator produces the rebuilt block B1 which is subsequently written to the disk drive DRIVE1.

For both the REGENERATE and the REBUILD operations, the specific implementation of the exclusive OR hardware and the order in which the data blocks and parity blocks are processed are commonly known in the industry.

Figure 7:
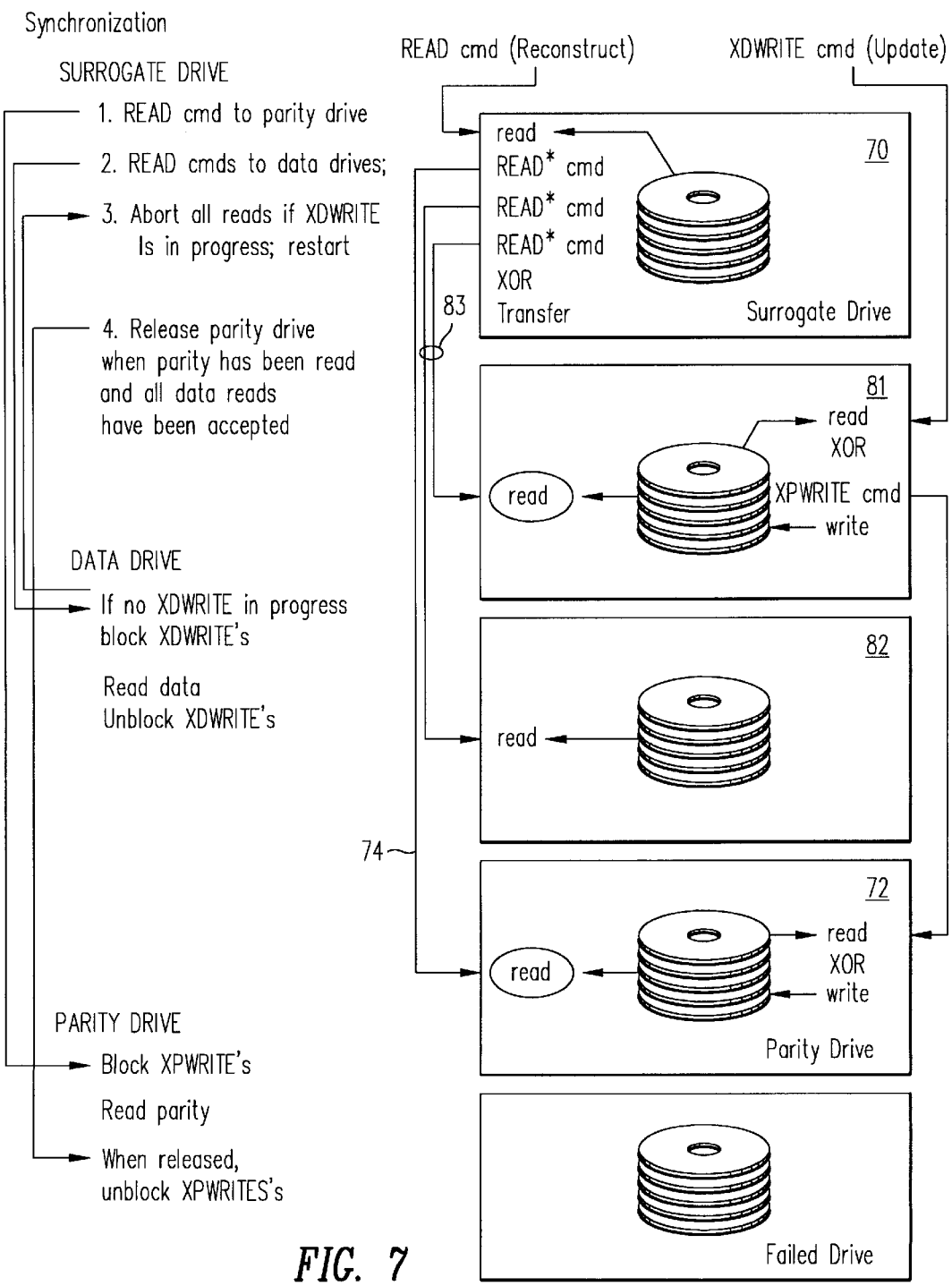
FIG. 7 is a diagram of the command synchronization for a reconstruction operation according to a first preferred embodiment.
Figure 8:
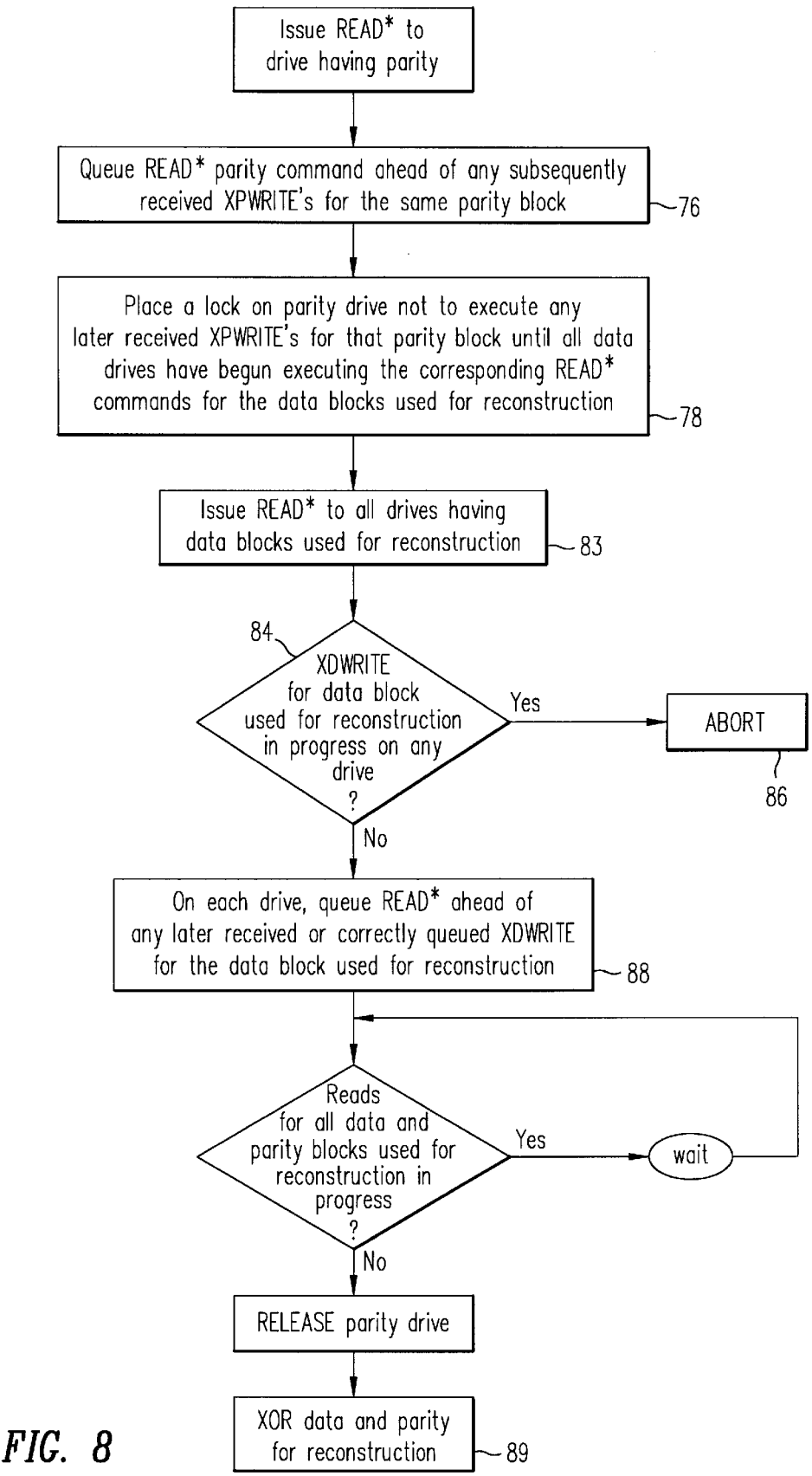
FIG. 8 is a flow diagram of the first preferred embodiment.

A first embodiment for the overall process for synchronizing the commands for regenerating and rebuilding (reconstructing) a data block will be described in more detail with reference to FIGS. 7 and 8. An initiator (surrogate drive) 70 issues a READ* command to the storage device 72 having the parity for the stripe in which the data block to be reconstructed belongs 74.

The storage device having the parity 72 either executes the READ* command or queues the READ* command on its command queue according to a priority scheme. The parity drive queues the READ* parity command ahead of any later received update parity commands (XPWRITES) for the same block(s) 76. Earlier received XPWRITE commands can be completed without causing inconsistencies. Allowing earlier received XPWRITES to execute reduces the need to abort for write operation (XDWRITE) in progress.

A special lock is placed on the parity drive not to execute any later received XPWRITE commands for the same parity block until all the data drives have begun executing their respective READ* commands for the set data blocks 78. When the storage device either executes the command or queues the command, an acknowledgment is sent to the initiator. When the initiator receives the acknowledgment it then issues the read request to each of the other storage devices 81 and 82 having the data blocks in the same parity stripe as the data block being reconstructed to read the remaining parity stripe data blocks 83.

When each of the storage devices receives the READ* command and before it queues the command, it checks to see what command is currently being executed 84. If an XDWRITE is in progress for the same data block, the time relationship between the associated XPWRITE and the READ* issued to the parity drive is undetermined. In that case, the READ* is rejected and the status indicating a possible update conflict is sent to the initiator drive. If any READ* is rejected or reports error status, the initiator aborts the rebuild/regenerate command and either aborts all associated READ* commands or discards the data received 86. The rebuild/regenerate command is then retried in its entirety.

When a READ* operation is accepted by a data drive, a queuing priority ensures that a queued READ* will be executed before a currently queued or later received XDWRITE for the same data block 88. Therefore, on the parity drive, the READ* will be executed before the XPWRITE for that data block, regardless of the order in which they are received. In that way, the sequence in which updated data and old parity or vice versa are read does not occur.

When the READ* command is executed by each storage device, the requested data block is sent back to the initiator. When the initiator has received all of the requested blocks, it releases the parity drive and XOR's the blocks to produce the reconstructed data. The reconstructed data is either written to the initiator drive media or sent to the host depending on whether its for a REBUILD or REGENERATE command.

The following queuing priorities are defined and are only used when the same logical block addresses are involved for reconstructing the data:

If XPWRITE is in the queue when READ* is received, queue the READ* behind the XPWRITE.

If READ* is in the queue when XPWRITE is received queue the XPWRITE behind the READ*.

If XDWRITE is in the queue when is received queue the READ* ahead of the XDWRITE or reject the READ*.

If READ* is in the queue when XDWRITE is received queue the XDWRITE behind the READ*.

The queuing priorities are further illustrated with reference to FIG. 6. There are four storage devices DRIVE0, DRIVE1, DRIVE2 and DRIVE3. Blocks B0, B1, and B2 are stored in the first sector of drives DRIVE0, DRIVE1 and DRIVE3 respectively. The XOR of data blocks B0, B1, and B2 produces the parity block P0 which is stored in the first sector of drive DRIVE4. The parity blocks are distributed evenly on all of the disk drives DRIVE0 through DRIVE3. In sector 2 of the disk drives, blocks B3, B4, and B5 and the parity P1 (XOR of blocks B3, B4 and B5) are stored on drives DRIVE0, DRIVE1, DRIVE3, and DRIVE2, respectively, and so forth.

As shown in FIG. 6 when a READ* B0 is received in DRIVE1's queue, the queue already contained other commands for other blocks and an XDWRITE command for the block B0 90. In that case, the READ* B0 is placed ahead of the XDWRITE B0, preferably at the top of queue 92 where the top of the queue is the next executed command. A subsequently received XDWRITE B0 command is queued behind the READ* B1 94.

On the drive DRIVE3 (having the parity for the stripe to which the block being reconstructed belongs), a READ* P0 is queued. In drive DRIVE3's queue, there are other commands, and also an XPWRITE for P0 previously enqueued 96. In that case, the READ* P1 gets queued behind the previously received XPWRITE P1 98. Once the READ* P0 is queued behind the XPWRITE P0, and another subsequently received XPWRITE block P0 is received, the subsequently received XPWRITE P0 is queued behind the READ* P0 99.

When a READ* command is received for a parity block when an update parity write command (XPWRITE) is in the queue for the same parity block, then the READ* command is queued behind the update parity command. Otherwise, the READ* is preferably queued at the top of the queue. Later, if an XPWRITE for that block is received, when the READ* command for that parity block is still in the queue, then the XPWRITE is queued behind the READ* command. Otherwise, the XPWRITE command is queued according to the normal priority scheme.

When a READ* command is received for a data block, the system first checks to see whether there is an update write (XDWRITE) in the queue for that same data block. The READ* command is queued ahead of any such XDWRITE commands. Otherwise, the XDWRITE command is queued preferably at the top of the queue. Consequently, the same queueing protocols are used for a READ* command whether or not there is an XDWRITE pending for that data block. That is, a READ* is given the highest priority, which is higher than a XDWRITE command. When a XDWRITE command is received and a READ* command for the same data block is in the queue, the XDWRITE command is queued behind the READ* command, otherwise the update write command would be queued according to its normal priority scheme.

The parity drive receives, and if necessary queues the READ* command before the corresponding READ* command had been issued to any data drive. Any XPWRITE for the same parity block that has already been received at the parity drive must have been the consequence of an XDWRITE already started by a data drive. The queuing priority ensures that queued READ* and XPWRITE commands for the same parity block are executed in the order received. Hence, the sequence in which inconsistent data and parity are XORed does not occur.

Using the queuing priorities, the operations can be coordinated simply and effectively without requiring host intervention, which can be complicated in multi-host environments.

When rebuilding one or more parity blocks in a single-parity array (RAID-4 or -5), only data blocks are read and exclusive-OR'ed. Consequently, in FIG. 8 there is no READ* command to the parity drive 75, but locking the parity drive queue is still required 78. The final XOR involves only data blocks 89.

Using this first preferred embodiment, reconstruction is delayed until there is no update in progress that might affect the reconstruction. The condition is made visible by blocking parity updates and observing that there are no uncompleted XDWRITEs at the data drives. During reconstruction, XDWRITEs are queued at the drives such that the data write update commands for the same data blocks cannot interfere with reconstruction. New XDWRITEs for the data blocks are allowed to start on any drive after the data block for the reconstruction has been read, but parity updates (XPWRITE) for the affected parity block continue to be blocked until all the necessary data and parity blocks have been read. Heavy update activity involving the reconstruction data could result in repeated failure of the reconstruction operation, particularly if the range of data blocks involved is loosely defined, such as updates for the entire drive. A particular example would be when reading all of a large data set from a failed drive while frequently updating another data set of the same parity segment.

In order to prevent an indefinite lockout of the reconstruction operation, a second preferred embodiment is provided. The second scheme involves quiescing all update activity that might affect reconstruction, and blocking the start of further XDWRITEs until all of the necessary data and parity blocks have been read. This ensures that a reconstruction will always complete but delays the start of all reconstructions.

Figure 9:
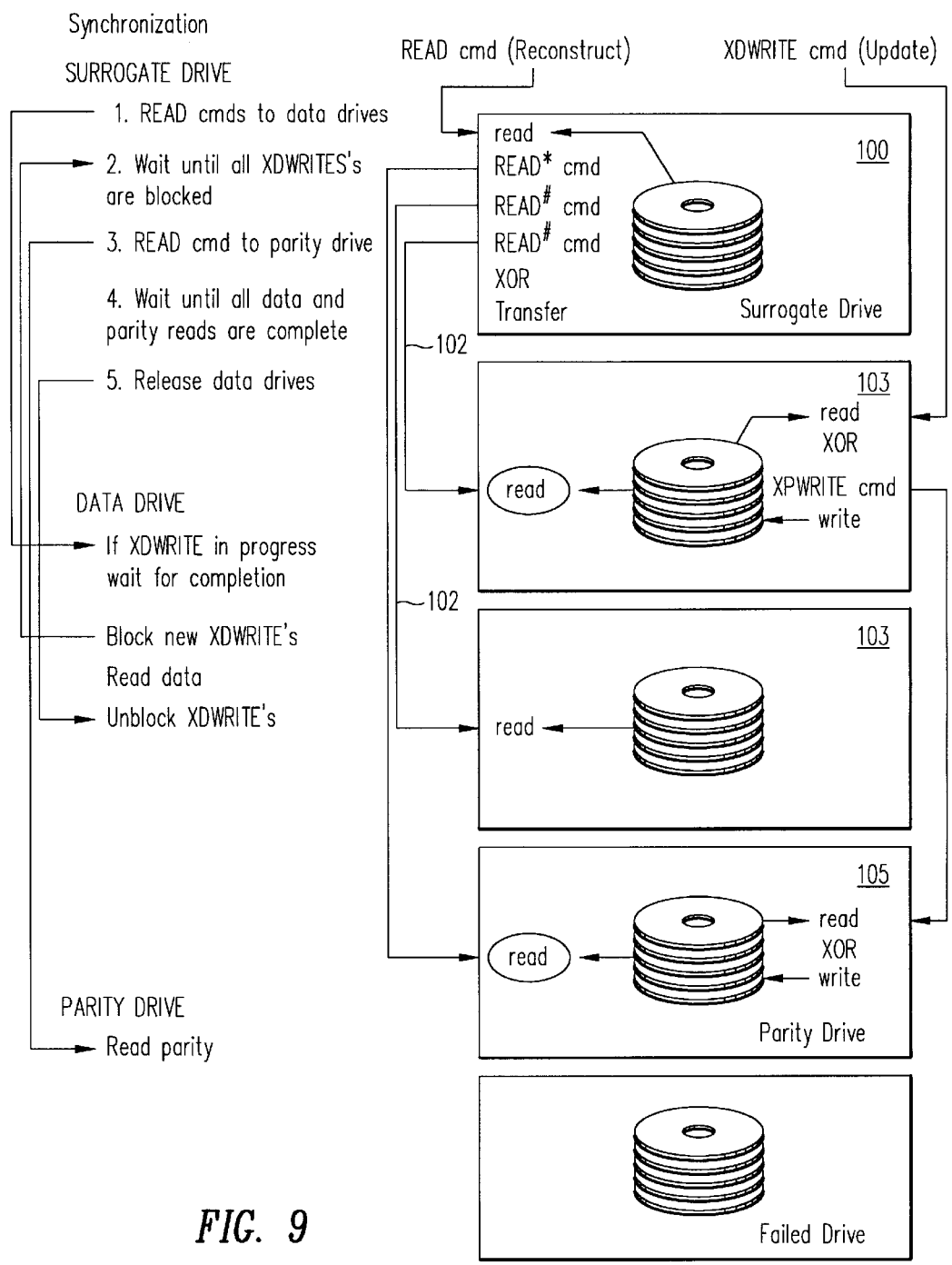
FIG. 9 is a diagram of the command synchronization for a reconstruction operation according to a second preferred embodiment.
Figure 10:
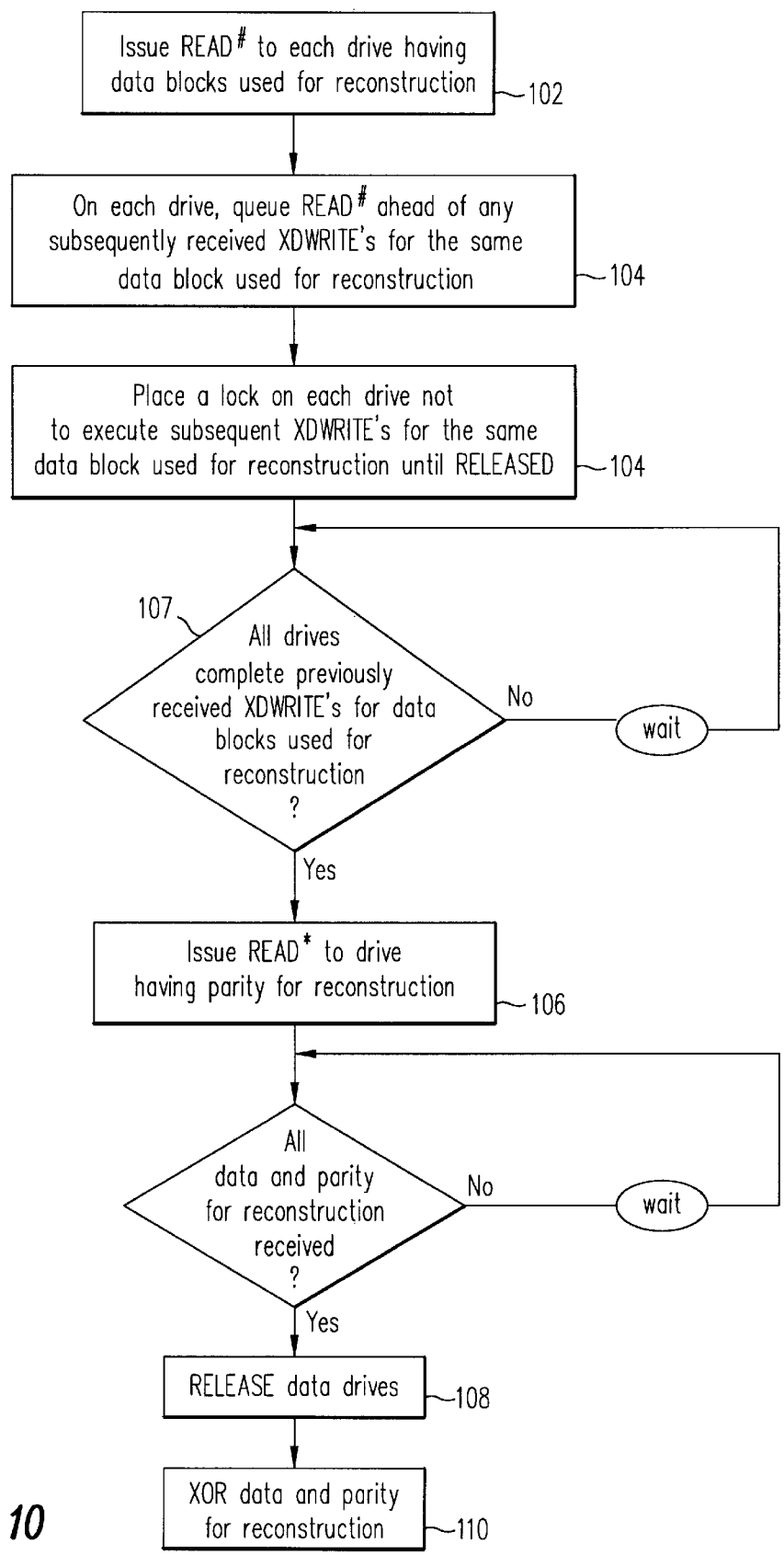
FIG. 10 is a flow diagram of the second preferred embodiment.

The second preferred embodiment for reconstructing unavailable data will be described with reference to FIGS. 9 and 10. Another new SCSI command is defined READ# which is similar to a READ* command. The READS command is not rejected if an XDWRITE is in progress and it prohibits the execution of queued XDWRITEs until a RELEASE is received. Like a READ* command, preferably, though not necessarily, a READ# is queued at the head of the drive's queue to be executed next.

The surrogate drive 100, acting as an initiator, issues READ# commands to read the data blocks of the parity stripe for the reconstruction 102. The READ# command is executed or queued in each of the drives 103 containing the corresponding data blocks such that subsequently received data and parity updates to the same blocks will not be started until the data has been read and a release signal has been received from the controlling drive 104. Updates (XDWRITEs) executing or queued ahead of the read operation for the same data blocks must complete both data and parity updates before the read operation becomes active. It is desirable, but not necessary that the READS commands for the data blocks of the parity stripe for reconstruction be put at the head of the queue when received.

After all data drives have completed any XDWRITEs for the same data blocks ahead of the READ# operations, a command is issued to the parity drive 105 to read the parity, the READ* command 106. In terms of the SCSI command protocols, a completed XDWRITE command requires the new data to be written, XPWRITE to be sent, new parity written, and XPWRITE ending status received at the successful completion of the XPWRITE. At that point there can be no competing data or parity update active.

When all data and parity blocks have been received, the initiator issues a RELEASE command to each data drive to release the hold on executing subsequently received XDWRITEs for the affected data blocks at the data drives 108.

In summary, READ# command is issued by the surrogate drive (initiator) to all the data drives involved in the reconstruction. When all READ# commands have executed, a READ* is issued to the parity drive. A lock is placed on all the data drives before executing a read command on the parity drive. The READ# optionally may cause a message to be sent to the initiator when there is no XDWRITE executing, or ahead of the READ# in the queue, so there is no waiting for the read to complete to issue the READ* to the parity drive 107.

The received data is then XORed by the initiator. For a REBUILD command this surrogate drive is a replacement for the failed drive and the date is written to its disk. For a REGENERATE command the reconstructed data is sent to the requesting host.

When rebuilding one or more parity blocks in a single-parity array (RAID-4 or -5), only data blocks are read and exclusive OR'ed. Consequently, in FIG. 10 there is no READ* command to the parity drive 106. When all data for reconstruction has been received, the data drives are released 108. The final XOR involves only data blocks 110.

Preferably, the initiator first attempts to implement the steps of the first preferred embodiment. If a READ* for the data block is not accepted because of an active XDWRITE for the same data block, the second preferred embodiment is performed.

A third preferred embodiment provides an alternative to the second preferred embodiment in the event that the first preferred embodiment can not be used. In the third scheme, update activity is quiesced but XDWRITEs for the reconstruction data are allowed to start on any drive after its reconstruction data has been read and transmitted to the controlling drive. Parity updates are blocked until all of the necessary data and parity blocks have been read.

Figure 11:
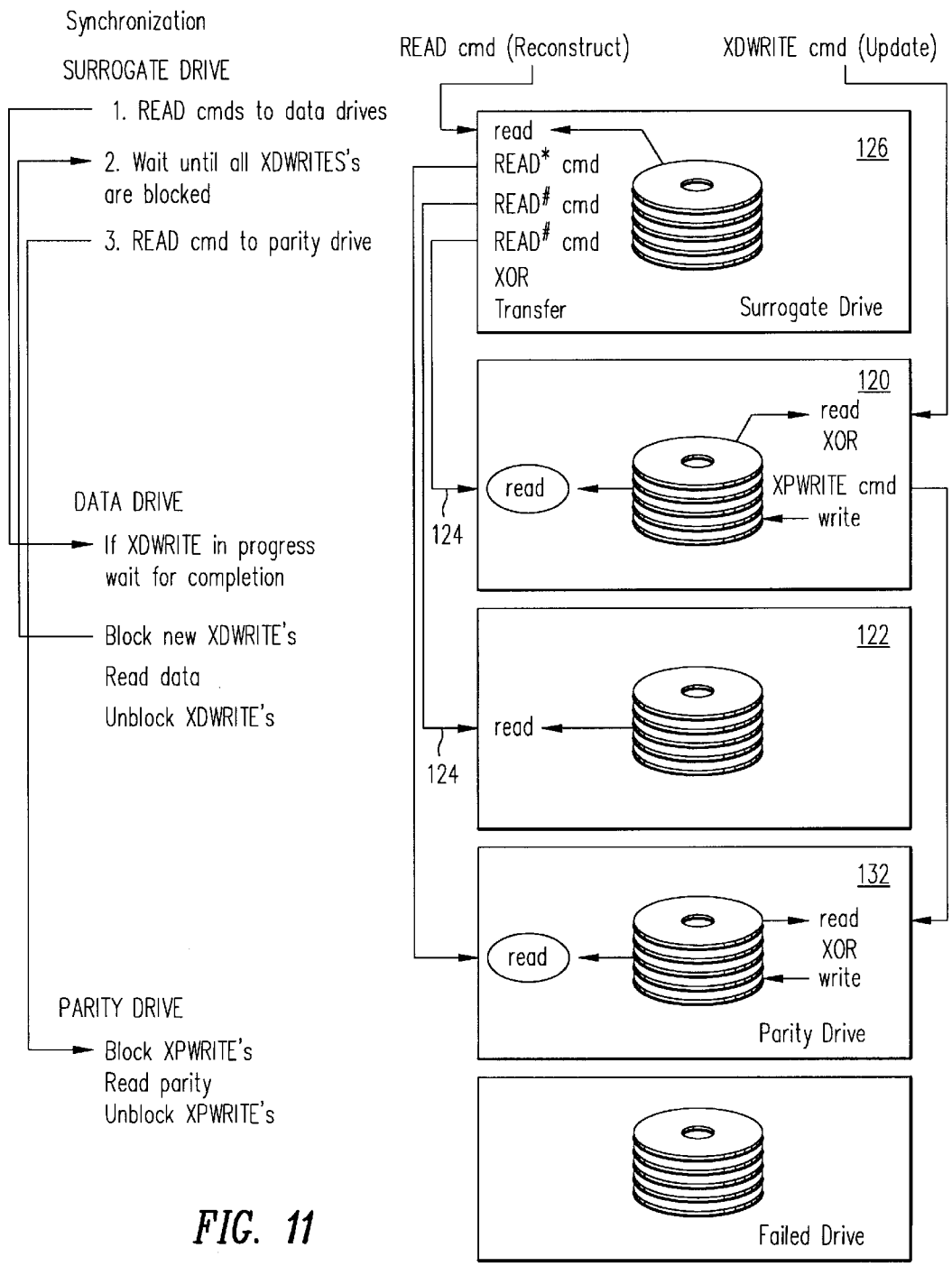
FIG. 11 is a diagram of the command synchronization for a reconstruction operation according to a third preferred embodiment.
Figure 12:
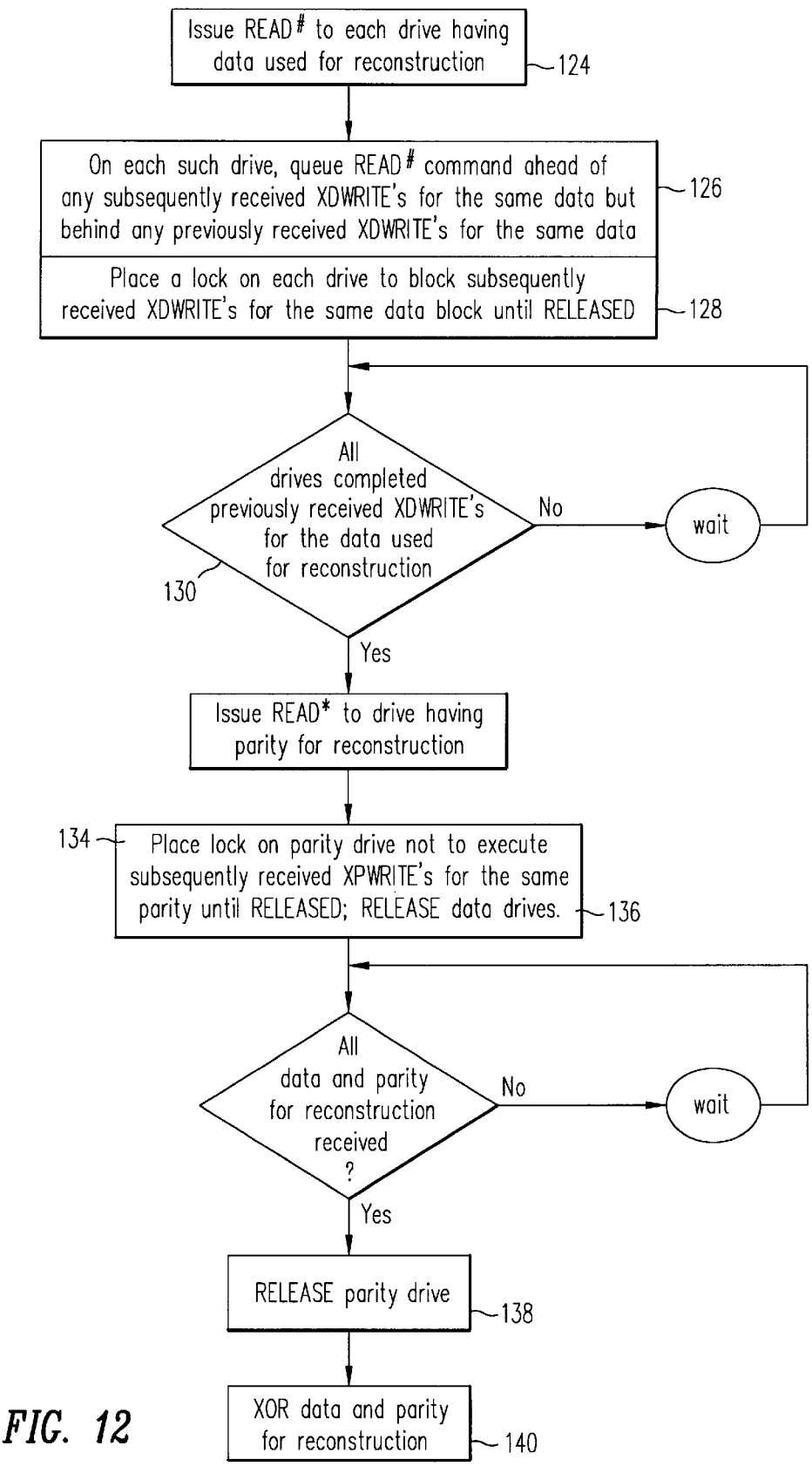
FIG. 12 is a flow diagram of the third preferred embodiment.

The third preferred embodiment will be described with reference to FIGS. 11 and 12. A READ* operation is issued to each drive 120 and 122 containing the corresponding data blocks 124. The READ# command is either executed or queued such that subsequently received data updates (XDWRITEs) for the same data blocks used for reconstruction will not be started until the data for the reconstruction has been read and transmitted to the initiator drive 126. In addition a lock is placed on each data drive to block subsequently received XDWRITEs for the same block until RELEASEd 128. XDWRITEs executing or queued ahead of the read operation must complete both the data and parity updates before the read operation becomes active 130. It is desirable, but not necessary that these read operations be placed at the head of the queue when received.

After all data drives have reported that there are no competing XDWRITEs ahead of the READ* operation, a READ# command is issued to the parity drive 132. A lock is placed on the parity drive 132 such that subsequently received parity updates (XPWRITEs) for the same parity block will not be started until the READ# is complete and a release signal has been received from the controlling drive (that is, the READ# operation has begun executing and data is ready to transfer) 134. Once a lock is placed on the parity drive, the locks on the data drives are RELEASEd 136.

When each data drive completes its read operation and transmits the data to the surrogate drive 126, and when the lock on the data drives have been RELEASEd, the queued XDWRITEs for the reconstruction data are allowed to proceed. When all data and parity blocks have been received by the surrogate drive 126, the hold on the parity drive is released 138. The received parity and data is XORed by the surrogate drive 140. If the operation is a REBUILD operation, then the surrogate drive is a replacement drive for the failed drive and the data is written to its disks. If the operation is a REGENERATE then the data is sent to the requesting host.

When rebuilding one or more parity blocks in a single-parity array (RAID-4 or -5), only data blocks are read and exclusive-OR'ed. Consequently, in FIG. 12 there is no READ* command to the parity drive 132, but locking the parity drive queue is still required 134. When all data for reconstruction has been received, the parity drive is released 138. The final XOR involves only data blocks 140.

Generally, the command queuing and execution in each of the preferred embodiments are defined such that the first initiator observes or creates a condition in which there are no competing updates that effect the data or parity block involved in the reconstruction. The initiator also ensures that new competing updates do not effect information used for reconstruction. The initiator causes the data and parity information to be read and transmitted to the initiator where the data or parity block are reconstructed. The coordination schemes are only required for updates and reconstruction involving some of the same data and parity blocks.

It should be understood that the foregoing description is only illustrative of the invention. Various alternatives and modifications can be devised by those skilled in the art of computer peripheral equipment without departing from the invention. For instance, the procedures described above can be operated by a data processing system in accordance with program data and instructions read from a magnetic disk or other recording media. The program can be distributed on any kind of storage media or operation on a computer system and can be transmitted across the Internet as part of the distribution medium. Accordingly, the present invention is intended to embrace all such alternatives, modifications, and variances which will fall within the scope of the independent claims.

We claim:

1. In an array of storage devices attached to at least one host computer system, having a plurality of parity stripes, each parity stripe comprising a set of date blocks and corresponding one or more parity blocks arranged on separate storage devices such that each data block can be reconstructed using the remaining data blocks of the set of data blocks and the parity block for the stripe, and wherein when an old data block is updated with an updated data block, a corresponding old parity block is updated with an updated parity block, a method for reconstructing an unavailable data block comprising the steps of:

(a) a first initiator issuing a first initiator command to each storage device to read the remaining blocks of the parity stripe;

(b) coordinating on each storage device using a command queue prioritization scheme each of said first initiator commands with any update command received from a second initiator, so that the set of data blocks and the parity block are consistent; and (c) the first initiator logically combining the remaining blocks of the parity stripe read from the storage devices to produce a reconstructed data block.

2. The method of claim 1, wherein each storage device comprises a processor, memory, parity generator and storage medium, further comprising the step of:

the host computer system issuing a reconstruction command for reconstructing the unavailable data block to a storage device which acts as the first initiator.

3. The method of claim 2, further comprising the steps of:

the first initiator storage device performing an XOR operation on the remaining blocks in the parity stripe to reconstruct the unavailable data block.

4. The method of claim 2, further comprising the step of the first initiator storage device writing the reconstructed data block to the storage media of the first initiator storage device.

5. The method of claim 2, further comprising the steps of:

the first initiator issuing a command to itself to read one of the remaining blocks of the parity stripe; and the first initiator storage device sending the reconstructed data block to the host computer system.

6. The method of claim 1, wherein the first and second initiators are first and second storage controllers, each storage controller acting as an independent initiator for reconstruction and updating of data blocks.

7. The method of claim 1, further comprising the steps of:

delaying the reconstruction until there are no updates in progress for any of the remaining data blocks in the set of data blocks; and ensuring that the parity block is not updated by subsequently received update commands until after the parity block is read for the reconstruction.

8. The method of claim 1, further comprising the steps of:

a) the first initiator issuing a command to read the parity block;

b) queuing the command to read the parity block ahead of any later received commands to update the parity block;

c) preventing the execution of subsequently received commands to update the parity block until after the remaining data blocks in the set of data blocks are read for the reconstruction;

d) the first initiator issuing commands to read each remaining data block in the set of data blocks after the command to read the parity block is queued;

e) queuing the commands to read the remaining data blocks in the set of data blocks ahead of any currently queued or subsequently received commands to update the data blocks; and f) waiting until there are no update commands for any of the remaining data blocks being executed before executing steps (a) through (e).

9. The method of claim 1, further comprising the steps of:

quiescing all update activity for the remaining data blocks in the set of data blocks; and ensuring that the remaining data blocks are not updated by subsequently received update commands until after the remaining blocks in the parity stripe are read for the reconstruction.

10. The method of claim 1, further comprising the steps of:

a) the first initiator issuing a command to read the parity block for the reconstruction after all update commands for the remaining data blocks have completed; and b) ensuring that subsequently received update commands for the remaining data blocks are not executed until after all of the remaining data blocks have been read for the reconstruction.

11. The method of claim 10, further comprising the step of:

queuing the commands to read the remaining data blocks for the reconstruction ahead of any subsequently received command to update the remaining data blocks and behind any previously received commands to update the remaining data blocks.

12. The method of claim 1, further comprising the steps of:

quiescing all update activity for the parity stripe data blocks;

ensuring that the parity block is not updated by subsequently received update commands until after the remaining blocks of the parity stripe are read for the reconstruction.

13. The method of claim 1, further comprising the steps of:

a) the first initiator issuing a command to read the parity block for the reconstruction after all update commands for the remaining data blocks have completed; and b) ensuring that subsequently received update commands for the parity block are not executed until after all of the remaining blocks of the parity stripe have been read.

14. The method of claim 13, further comprising the step of:

queuing the commands to read the remaining data blocks ahead of any subsequently received command to update the remaining data blocks and behind any previously received commands to update the remaining data blocks.

15. A storage apparatus for a computer system comprising:

a plurality of storage devices, each storage device comprising a processor, memory, a logical combination generator, and a storage media, parity stripes comprising a set of data blocks and at least one corresponding parity block being arranged on the storage media of the storage devices such that an unavailable block can be reconstructed using the remaining blocks of the parity stripe, and wherein when an old data block is updated with an updated data block, a corresponding old parity block is updated with an updated parity block;

an interface connection between each of the storage devices for sending and receiving commands for reading data blocks and reading parity blocks and writing updated data blocks and writing updated parity blocks;

at least two independent initiators reconstructing and updating data blocks including a reconstruction initiator for coordinating the reconstruction of the unavailable data block using the remaining blocks of the parity stripe read from respective storage devices, independent of the host system; and a command queue prioritizer for each storage device prioritizing commands from a first initiator for reconstructing the unavailable data block with commands from a second initiator for updating data blocks and parity blocks of the parity stripe, such that the data block is reconstructed without combining an updated block with an old block.

16. The storage system of claim 15, wherein the initiator writes the reconstructed data block to the storage media where the unavailable data block was stored.

17. The storage system of claim 15, wherein the initiator sends the reconstructed data block to the host computer system.

18. An article of manufacture for use in an array of storage devices for reconstructing an unavailable data block, the array being attached to a host computer system, each storage device comprising, a processor, memory, and a storage media, having sets of data blocks and corresponding parity blocks arranged on the storage media such that a data block can be reconstructed using remaining set data blocks and corresponding parity block, wherein when an old data block is updated with an updated data block, a corresponding old parity block is updated with an updated parity block, said article of manufacture comprising a computer-readable storage medium having a computer program code embodied in said medium which causes the array of storage devices to:

issue a reconstruction read command to each storage device having the remaining set data blocks or the corresponding parity block, to read the set data block or the corresponding parity block;

queue each command on a respective queue for each storage device, in a priority order, coordinating each reconstruction read command with any write command so that only an updated data block is read with an updated parity block while an old data block is read with an old parity block to reconstruct the unavailable data block; and logically combine the remaining data blocks and the set parity block read from the storage devices to produce a reconstructed data block.

19. The article of manufacture of claim 18, wherein the computer program code further causes the array of storage devices to write the reconstructed data block to the storage media having the data block to be reconstructed.

20. The article of manufacture of claim 18, wherein the computer program code further causes the array of storage devices to send the reconstructed data block to the host computer system.

* * * * *